US009436410B2

(12) United States Patent
Curley et al.

(10) Patent No.: US 9,436,410 B2
(45) Date of Patent: Sep. 6, 2016

(54) REPLICATION OF VOLUMES ON DEMANDS USING ABSENT ALLOCATION

(71) Applicant: NetApp, Inc., Sunnyvale, CA (US)

(72) Inventors: Jonathan Curley, Pittsburgh, PA (US); Srishylam Simharajan, Cranberry Twp, PA (US)

(73) Assignee: NETAPP, INC., Sunnyvale, CA (US)

( * ) Notice: Subject to any disclaimer, the term of this patent is extended or adjusted under 35 U.S.C. 154(b) by 108 days.

(21) Appl. No.: 14/299,295

(22) Filed: Jun. 9, 2014

(65) Prior Publication Data

US 2015/0169225 A1 Jun. 18, 2015

Related U.S. Application Data

(60) Provisional application No. 61/915,968, filed on Dec. 13, 2013.

(51) Int. Cl.

| *G06F 12/00* | (2006.01) |
| *G01F 13/00* | (2006.01) |
| *G06F 3/06* | (2006.01) |
| *H04L 29/08* | (2006.01) |
| *G01S 7/41* | (2006.01) |
| *G01S 13/04* | (2006.01) |
| *G01S 13/56* | (2006.01) |
| *G01S 13/88* | (2006.01) |

(52) U.S. Cl.
CPC ............... *G06F 3/065* (2013.01); *G01S 7/415* (2013.01); *G01S 13/04* (2013.01); *G01S 13/56* (2013.01); *G01S 13/886* (2013.01); *G06F 3/067* (2013.01); *G06F 3/0619* (2013.01); *H04L 67/1095* (2013.01); *H04L 67/1097* (2013.01)

(58) Field of Classification Search
None
See application file for complete search history.

(56) References Cited

U.S. PATENT DOCUMENTS

| 7,085,904 | B2* | 8/2006 | Mizuno | G06F 11/1451 707/999.202 |
| 8,595,188 | B2* | 11/2013 | Gruhl | G06F 11/1451 707/646 |
| 2004/0205310 | A1* | 10/2004 | Yamagami | G06F 11/2058 711/162 |
| 2005/0086432 | A1* | 4/2005 | Sakai | G06F 3/0605 711/114 |
| 2005/0210193 | A1* | 9/2005 | Nagata | G06F 11/1435 711/114 |
| 2006/0218203 | A1* | 9/2006 | Yamato | G06F 11/2082 |
| 2011/0191295 | A1 | 8/2011 | Ozdemir et al. | |
| 2012/0311280 | A1* | 12/2012 | Schmidt | G06F 11/1469 711/162 |
| 2013/0042083 | A1* | 2/2013 | Mutalik | G06F 17/30162 711/162 |
| 2013/0080389 | A1 | 3/2013 | Curley et al. | |

OTHER PUBLICATIONS

International Search Report for International Patent Application No. PCT/US2014/066635 (mailed: Feb. 10, 2015).

* cited by examiner

*Primary Examiner* — Sean D Rossiter (57) ABSTRACT

A method, non-transitory computer readable medium and programmed apparatus that receives a request to replicate a volume from a source to a destination. The volume includes data and metadata including information descriptive of the data. The method includes determining a first set of blocks and a second set of blocks associated with the source, where the first set of blocks is associated with the metadata, and where the second set of blocks is associated with the data. The method includes initiating, based on the first set of blocks, replication of the volume from the source to the destination to generate a replicated volume at the destination. The replicated volume includes replicated metadata generated based on the replicated first set of blocks and includes absent allocated data corresponding to the data included in the volume storage at the source storage system.

18 Claims, 3 Drawing Sheets

REPLICATION OF VOLUMES ON DEMANDS USING ABSENT ALLOCATION

This application claims the benefit of U.S. Provisional Patent Application Ser. No. 61/915,968 filed Dec. 13, 2013, which is hereby incorporated by reference in its entirety.

FIELD

This technology is generally related to replication of and relocation of data volumes using absent allocation.

BACKGROUND

Use of storage systems (e.g., storage area networks (SANs), network appliances, etc.) to store data have become widespread, and may store large amounts of data (e.g., fifty (50) terabytes or more) using a plurality storage devices (e.g., hard disk drives, solid state storage devices, optical disk drives, etc.). Data stored at such storage systems may include a data (e.g., user files, applications, application data, etc.) and metadata that includes information descriptive of the data. The data may be organized into containers (e.g., directories, volumes, virtual volumes, partitions, etc.) by a file system.

Additionally, the storage systems may span across geographically disparate areas. For example, a SAN may include a first storage system located at a first location and a second set of storage system located at a second location that is remote to the first location. Data stored at the SAN may be distributed among the first storage system and the second storage system. The SAN may be coupled to client devices (e.g., personal computing devices, laptop computing devices, tablets, mobile communication devices, servers, etc.) located at the first and second locations via a network (e.g., a local area network (LAN), a wide area network (WAN), etc.) and may provide the client devices with access to the data stored at the first storage system and the second storage system.

As the amount of data stored in the data storage systems increases, management of the data becomes more difficult. For example, a portion of the data may be replicated (e.g., as part of a clone operation, a data relocation operation, a backup operation, etc.) from the first storage system to the second storage system. During replication of the data, access to the first storage system by client devices may be locked to prevent modification of the portion of the data until the replication is complete. Alternatively, an image (e.g., a snapshot) of the data stored at the first storage system may be captured and the portion of the data may be replicated using the image (i.e., so that client devices may continue to access the portion of the data).

Regardless of whether the portion of the data is replicated using the image or by locking access to the portion of the data, the portion of the data is replicated by performing a block-by-block copy of the data from a source storage system (e.g., the first storage system) to a destination storage system (e.g., the second storage system). This may take several minutes or hours which may introduce undesirable delays.

Additionally, when the portion of the data is replicated based on the snapshot, the client devices may modify the portion of the data prior to completing the replication. Thus, the replicated portion of the data may be inaccurate or out of date upon completion of the replication, requiring additional replication using block-by-block copying, introducing further delays.

SUMMARY

Disclosed herein are methods, systems, apparatuses, and non-transitory computer-readable media that enable a data volume to be replicated (e.g., moved, cloned, backed up, etc.) virtually on demand. A volume may include data stored at one or more storage devices of a storage system (e.g., a source storage apparatus). A file system associated with the storage system may manage the data and may generate metadata that includes information descriptive of the data included in the volume. In an aspect, the volume may be replicated from the source storage system to a destination storage system to create a replicated volume. The replicated volume may be created using absent allocation. Replicating the volume using absent allocation may include replicating the metadata associated with the volume. For example, the metadata associated with the volume may be replicated from the source storage system to the destination storage system. The data included in the volume may be replicated to the destination storage system using absent allocation, such that the replicated volume created at the destination storage system includes replicated metadata (e.g., a copy of the metadata associated with the source volume) and absent allocated data (e.g., information indicating that the data included in the volume has not been replicated to the destination storage system). After the replicated volume is created, a client device may access the data via the destination volume based on the absent allocated data.

To illustrate, absent allocating the data at the destination storage system may include associating absent allocation states (AA states) with the replicated volume (or the replicated metadata). The replicated metadata may include a buffer tree and a container map (also known as a container file). The buffer tree and the container map may include information that indicates whether the data is present at the destination storage system. In an aspect, the information may include suggestive indicators (e.g., indicators that identify data in a first AA state) that provides a non-determinative indication that data is absent from the replicated volume. In an additional aspect, the information may include determinative indicators (e.g., indicators that identify data a second AA state) that provides a determinative indication that the data is absent from the replicated volume. In an aspect, the suggestive indicators may be stored in the buffer tree, and the determinative indicators may be stored in the container map.

Subsequently, the data may be replicated from the source storage system to the destination storage system using various techniques. For example, the data may be replicated as part of a background replication process (e.g., as system resources permit), or may be replicated in response to a request received at the destination storage system (e.g., a request to access particular data). As the data is replicated from the source storage system to the destination storage system, the AA state indictors (e.g., the suggestive indicators and the determinative indicators) may be updated.

By replicating metadata from a source storage system to a destination storage system and absent allocating data from the source storage system to the destination storage system, the replicated volume at the destination storage system may provide access to the data in less time than traditional replication techniques. Additionally, a volume replicated according to one or more aspects of this technology may provide increased volume accessibility to client devices because the data is accessible via the destination storage system prior to replicating the data to the destination storage system. This may reduce an amount of delay introduced by replication of the volume as compared to other replication techniques and may reduce an amount of storage system resources required to perform the replication.

This technology provides a number of advantages including providing methods, systems, apparatuses, and non-transitory computer-readable media that effectively enable replication of volumes on demand using absent allocation. This technology may reduce an amount of time required to replicate a volume (e.g., an amount of time between receiving the volume replication request 112 and completing the cutover process). Additionally, by using the suggestive indicators and determinative indicators to indicate whether absent allocated data is present or absent from a replicated volume, this technology is able to reduce an amount of time required to retrieve the absent allocated data. Further, one or more aspects of this technology may enable access to data that is absent from a replicated volume

DETAILED DESCRIPTION

Figure 1:
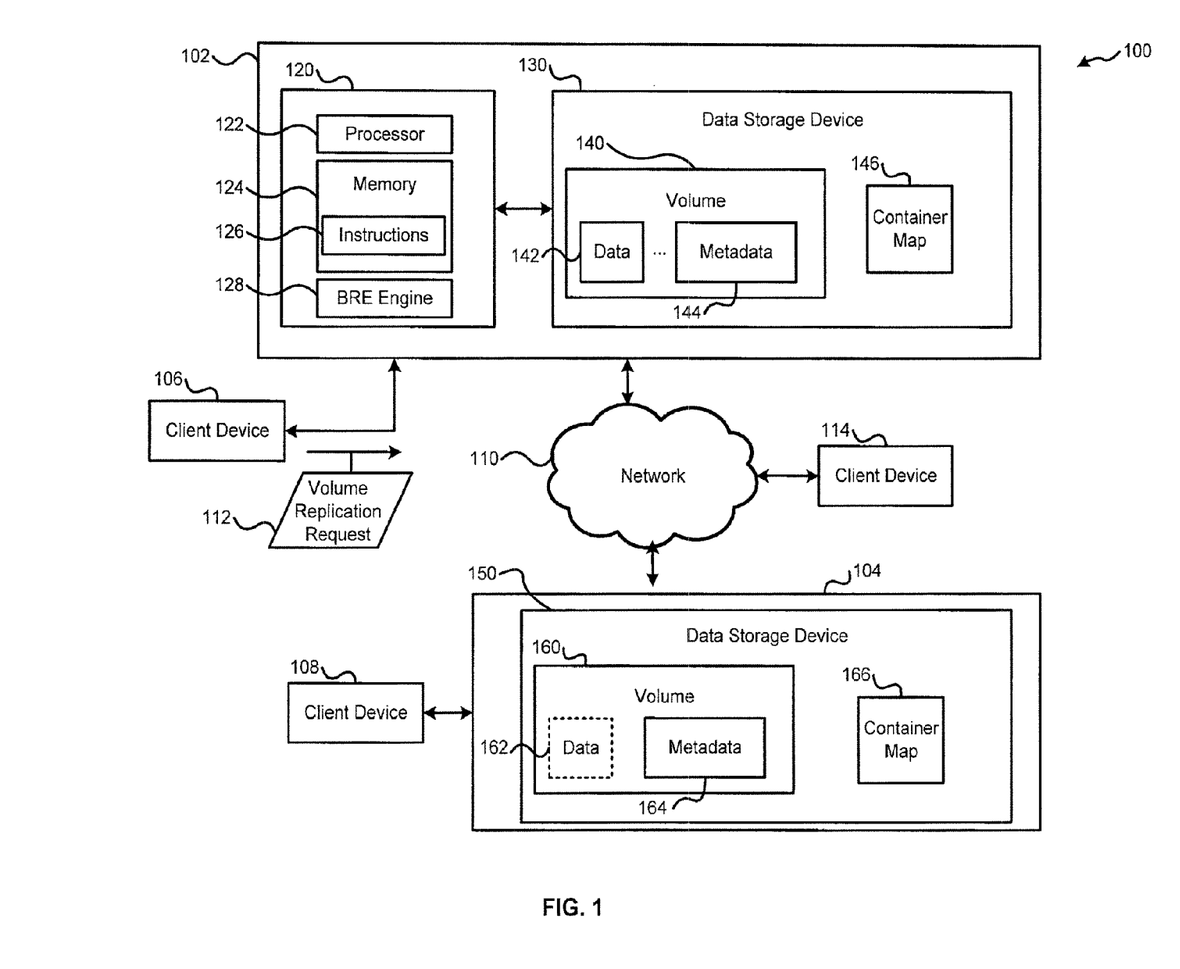
FIG. 1 is a block diagram of an example of a storage environment for replicating volumes using absent allocation.

Referring to FIG. 1, an illustration of a storage system for replicating volumes using absent allocation according to an aspect of this technology is shown and designated 100. As shown in FIG. 1, the environment 100 includes a first storage apparatus 102 and a second storage apparatus 104. In an aspect, the environment 100 may be a storage area network (SAN) that provides a persistent common view of data stored at the first storage apparatus 102 and the second storage apparatus 104. The first storage apparatus 102 and the second storage apparatus 104 may be communicatively coupled via a network 110. In an aspect the network 110 may be a local area network (LAN), a wide area network (WAN), a wireless local area network (WLAN), an internet, a combination of these networks, or other types of networks. This technology provides a number of advantages including providing methods, systems, apparatuses, and non-transitory computer-readable media that effectively enable replication of volumes on demand using absent allocation.

The environment 100 may provide client devices 106, 108 and 114 with access to data stored at the first storage apparatus 102 and the second storage apparatus 104. For example, as shown in FIG. 1, a first client device 106 may be communicatively coupled to the first storage apparatus 102 and a second client device 108 may be coupled to the second storage apparatus 104. In another aspect, a third client device 114 may be communicatively coupled to the environment 100 via the network 110. The client devices 106, 108, and 114 may access (e.g., locally or via the network 110) the data stored at the first storage apparatus 102 and the second storage apparatus 104. The client devices 106, 108, and 114 may modify, delete, create, move, and/or copy data stored at the first storage apparatus 102 and the second storage apparatus 104.

As shown in FIG. 1, the first storage apparatus 102 includes a controller 120 and a data storage device 130. The controller 120 may include a processor 122, a memory 124, and a block replication engine (BRE) 128, although the controller may comprise other types and/or numbers of other system, devices, components and/or other elements in other configurations. Additionally, the first storage apparatus 102 may include other system, devices, components and/or other elements in other configurations which have not been illustrated in FIG. 1 in order to simplify FIG. 1. For example, for ease of illustration a network interface to couple the first storage apparatus 102 to the network 110 and/or the client device 106 is not illustrated since these are well known to be used by one of ordinary skill in the art. As another example, the first storage apparatus 102 may include a module or other programmed instructions that process data received from or provided to the network 110 according to one or more communication protocols (e.g., a TCP/IP protocol and/or other communication protocols), and may include another module that processes data to be stored at or retrieved from the data storage device 130 in accordance with one or more data storage protocols (e.g., a SAN protocol, a small computer system interface (SCSI) protocol, a fiber channel protocol (FPC), etc.). The memory 124 may store instructions 126 that, when executed by the processor 122, cause the processor 122 to perform operations in accordance with one or more aspects of this technology, as illustrated and described in the examples herein with reference to FIGS. 1-3. It is noted that although the BRE engine 128 is illustrated in FIG. 1 as being separate from the processor 122, in another aspect, the BRE engine 128 may be integrated with the processor 122 (e.g., in hardware) or may be implemented by the processor 122 during execution of the instructions 126.

The data storage device 130 may include one or more storage devices (e.g., hard disk drives (HDDs), solid state drives (SSDs), FLASH memory devices, optical disk drives, and/or other computer-readable storage devices) configured to store data. By way of example only, in FIG. 1, the data storage device 130 includes a volume 140 and a container map 146, although the data storage device may have other system, devices, components and/or other elements in other configurations. In this example, the volume 140 may include data 142 and metadata 144, although the volume may have other contents. The data 142 may include user data (e.g., files), applications, application data, etc. The metadata 144 may include information descriptive of the data 142. Additional aspects of this example of the technology with respect to the metadata 144 and the container map 146 are described with reference to FIG. 2. Although not shown in FIG. 1, the second storage apparatus 104 may also include a controller and other components as described and illustrated with respect to the first storage apparatus 102. The second storage apparatus 104 also includes a data storage device 150. The data storage device 150 may include one or more storage devices (e.g., HDDs, SSDs, FLASH memory devices, optical disk drives, and/or other computer-readable storage devices) configured to store data.

The data storage devices 130, 150 may each comprise a plurality of data blocks that may be used to provide various logical and/or physical storage containers, such as the volume 140. The plurality of data blocks may also be used to provide other containers (e.g., files, volumes, aggregates, virtual disks, etc.). The logical and physical storage containers may be defined using an array of blocks indexed or mapped either logically or physically by a file system using various types of block numbers. For example, a file may be indexed by file block numbers (FBNs), a container file (e.g., a volume) by virtual block numbers (VBNs), an aggregate by physical block numbers (PBNs), and disks by disk block numbers (DBNs). To translate an FBN to a disk block, a filesystem (e.g., a WAFL filesystem) may use several steps, such as translating the FBN to a VBN, translating the VBN to a PBN, and then to translating the PBN to a DBN. Storage containers having various attributes may be defined and utilized using such logical and physical mapping techniques.

Data structures may be used to map the various types of block numbers to locations on disks of a storage device. For example, an aggregate may be a physical volume (PVOL) that includes one or more storage devices (e.g., the storage device 130). A container, such as the volume 140, may be a virtual volume (VVOL) that is created within the PVOL of the aggregate. The one or more storage devices included in aggregate may include a plurality of disk blocks indexed by DBNs. For example, the plurality of disk blocks may include disk blocks 0-N that may be indexed using DBNs DBN-0 to DBN-N.

When the container (e.g., the volume 140) is created on the aggregate, a subset of the plurality of disk blocks (e.g., DBN-0 to DBN-M, where M<N) may be allocated to the container. As explained above, the container may be indexed by VBNs that map to PBNs, and the PBNs may be mapped to DBNs (e.g., the DBNs DBN-0 to DBN-M). Thus, when the container is created, data structures to provide mapping of the VBNs and the PBNs of the VVOL to the DBNs of the PVOL may be created.

As an example, a buffer tree may be created and stored within the container (e.g., as metadata) and may enable mapping of VBNs and PBNs used to index the container to the DBNs of the aggregate. The buffer tree may include information (e.g., pointers) that references locations (e.g., DBNs) on the aggregate where data (e.g., the data 142) included in the VVOL are stored. The pointers may reference indirect blocks (e.g., "L1" blocks) that, in turn, reference the DBNs (e.g., "L0" blocks). In an aspect, the metadata 144 may include a buffer tree associated with the volume 140. An illustrative embodiment of a buffer tree according to one or more aspects of this technology is described with reference to FIG. 2. As another example, a container map, such as the container map 146 of FIG. 1, may be created and may also enable mapping of the VBNs and PBNs of the container to the DBNs of the aggregate. In an aspect, the container map may be stored external to the container. An illustrative embodiment of a container map according to one or more aspects of this technology is illustrated and described herein with reference to FIG. 2.

Figure 2:
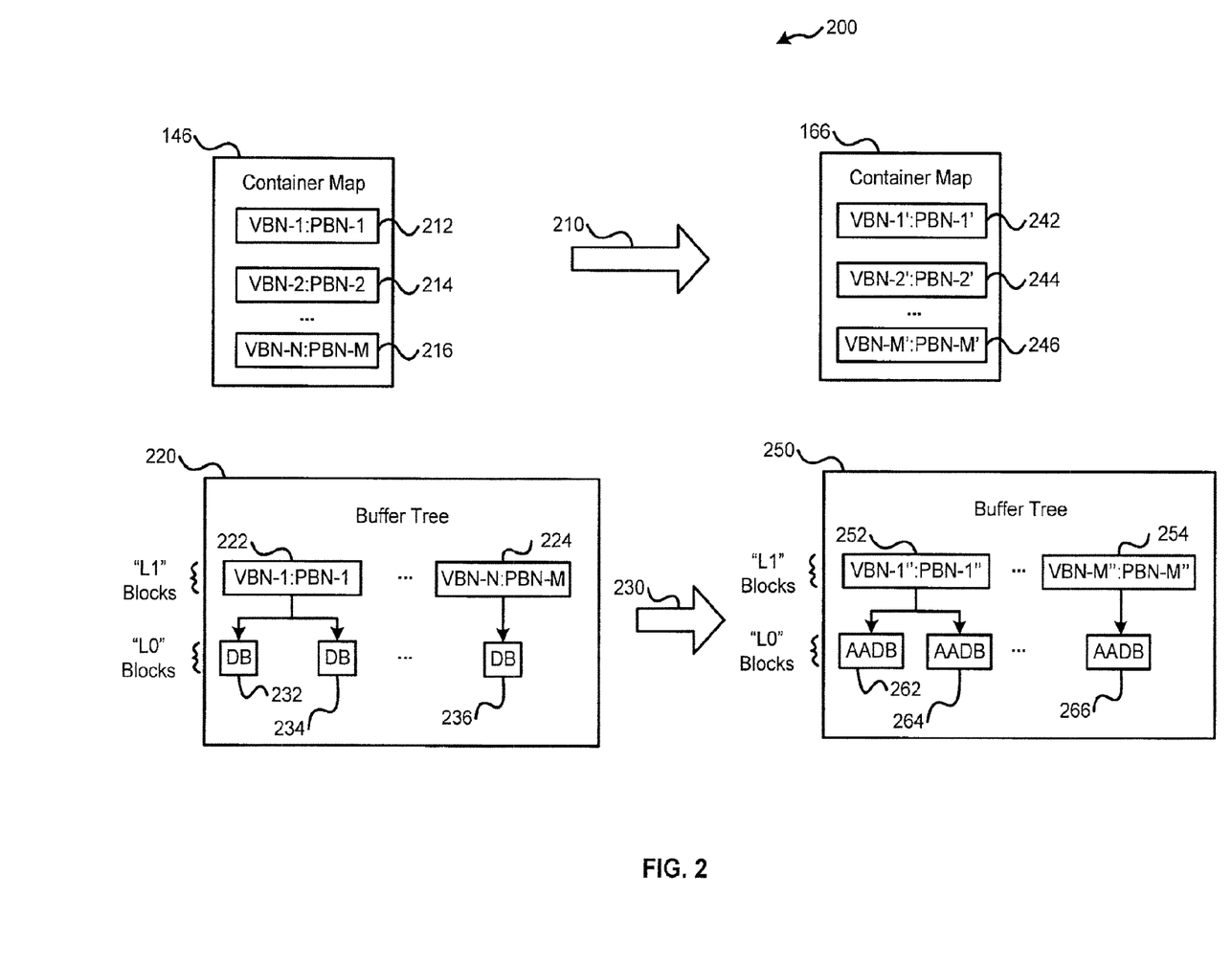
FIG. 2 is a diagram of an example of data structures that may be used to facilitate replication of volumes using absent allocation.

Referring to FIG. 2, an illustration of data structures that may be used to facilitate replication of volumes using absent allocation according to aspects of this technology is shown and designated 200. In FIG. 2, the container map 146 of FIG. 1 and the replicated container map 166 of FIG. 1 are shown. Additionally, a buffer tree 220 and a buffer tree 250 are shown. In an aspect, the buffer tree 220 may be included in the metadata 144 of FIG. 1 and the buffer tree 250 may be included in the replicated metadata 164 of FIG. 1.

As described with reference to FIG. 1, the container maps 146, 166 and the buffer trees 220, 250 may be used to map virtual block numbers (VBNs) to physical block numbers (PBNs), and the PBNs may be mapped to disk block numbers (DBNs) corresponding to disk blocks of an aggregate that have been allocated to a container (e.g., the volume 140 of FIG. 1 or the replicated volume 160 of FIG. 1) and that store data (e.g., the data 142 of FIG. 1). As the container map 146 and the buffer tree 220 are replicated (indicated by the arrows 210 and 220, respectively) from the first storage apparatus 102 to the second storage apparatus 104 to create the replicated volume 160 of FIG. 1, absent allocation states (AA states) associated with the data (e.g., the data 162 of FIG. 1) may be applied to the information included in the container map 166 and the buffer tree 250 to indicate that the data is absent from the replicated volume 160 of FIG. 1 at the destination (e.g., the second storage apparatus 104).

The AA states may include suggestive absent allocated information (e.g., suggestive indicators) and determinative absent allocated information (e.g., determinative indicators), as described with reference to FIG. 1. The suggestive absent allocated information may be included within the buffer tree 250 which may be stored within the replicated volume 160 (e.g., as part of the replicated metadata 164), and the determinative absent allocated information may be included in the replicated container map 166, which may be stored external to the replicated volume 160. The suggestive absent allocated information may provide a non-authoritative or non-determinative indication (i.e., a rebuttable suggestion) that the data of a particular data block may not be present at the destination. The determinative absent allocated information may provide an authoritative or determinative indication (e.g., a final determination) that the data of a particular data block is not present on the destination.

As shown in FIG. 2, the container map 146 may include a plurality of entries 212-216 that identify a plurality of VBNs (e.g., VBN-1 to VBN-M) that have been allocated to the volume 140. The plurality of VBNs of the container map 146 may include a first entry 212 having a first VBN index VBN-1 that may be associated with (or mapped to) a first PBN having an index of PBN-1. The plurality of VBNs may include a second entry 214 having a second VBN index VBN-2 that may be associated with (or mapped to) a second PBN index PBN-2. The plurality of VBNs may include an $M^{th}$ entry 216 having an $M^{th}$ VBN index VBN-M that may be associated with (or mapped to) a $M^{th}$ PBN index PBN-M. The plurality of entries of the container map 146 may be used to map VBNs and PBNs (associated with requests for access to the data 142 of FIG. 1) to DBNs (e.g., to disk blocks where the data 142 resides), as described with reference to FIG. 1. Information stored in the container map 146 may also be stored in the buffer tee 220.

For example, as shown in FIG. 2, the buffer tree 220 includes a plurality of "L1" blocks 222 to 224. The "L1" block 222 may include the first VBN index VBN-1 that may be associated with (or mapped to) the first PBN index PBN-1, and the $M^{th}$ "L1" block 224 may include the $M^{th}$ VBN index VBN-M that may be associated with (or mapped to) the $M^{th}$ PBN index PBN-M. The plurality of entries of the buffer tree 220 may also be used to map the VBNs and the PBNs to DBNs (e.g., disk blocks 232, 234, 236), as described with reference to FIG. 1.

During replication of the volume 140, the processor 122 or the BRE engine 128 in the controller 120 of FIG. 1 may apply absent allocation indicators (e.g., by applying the reserved PBNs to the absent allocated data blocks) to the metadata 144 to generate the replicated metadata 164. For example, the processor 122 or the BRE engine 128 in the controller 120 may scan the first snapshot and, for each "L1" block (e.g., the "L1" blocks 222-224), may insert reserved PBNs into each of the entries of the buffer tree 220. The reserved PBNs inserted in to the replicated buffer tree 250 may correspond to suggestive indicators and may be invalid PBNs. Additionally, the processor 122 or the BRE engine 128 in the controller 120 may replicate the container map 146 by applying the same or a different reserved PBNs to the plurality of entries of the container map 146 to generate the replicated container map 166. The reserved PBNs inserted in to the replicated container map 166 may correspond to determinative indicators and may be invalid PBNs.

To illustrate, as shown in FIG. 2, the replicated container map 166 may include a plurality of entries 242-246 that identify a plurality of VBNs (e.g., VBN-1' to VBN-M') that have been allocated to the replicated volume 160. The plurality of VBNs of the container map 166 may include a first entry 242 having a first VBN index VBN-1' that may be associated with (or mapped to) a first PBN having an index of PBN-1'. The plurality of VBNs may include a second entry 244 having a second VBN index VBN-2' that may be associated with (or mapped to) a second PBN index PBN-2'. The plurality of VBNs may include an $M^{th}$ entry 246 having an $M^{th}$ VBN index VBN-M' that may be associated with (or mapped to) a $M^{th}$ PBN index PBN-M'. In an aspect, the PBN indices PBN-1' to PBN-M' may correspond to a set of one or more reserved PBNs used to provide a determinative indication that data is absent (e.g., an indication as to whether a particular data block is in an absent AA state or a present AA state).

As shown in FIG. 2, the buffer tree 250 includes a plurality of "L1" blocks 252 to 254. The "L1" block 252 may include the first VBN index VBN-1' that may be associated with (or mapped to) a PBN index PBN-1", and the $M^{th}$ "L1" block 254 may include the $M^{th}$ VBN index VBN-M' that may be associated with (or mapped to) the $M^{th}$ PBN index PBN-M". The plurality of entries of the buffer tree 220 may also be used to map the VBNs and the PBNs to DBNs (e.g., disk blocks 262, 264, 266), as described with reference to FIG. 1. In an aspect, the PBN indices PBN-1" to PBN-M" may correspond to a set of one or more reserved PBNs used to provide a suggestive indication that data (e.g., the data 262, 264, 266) is absent allocated (e.g., an indication as to whether a particular data block is in an absent allocated AA state).

In an aspect, the suggestive indicators and the determinative indicators may be used to determine whether the requested data is present in the replicated volume 160, and, when a determination is made that requested data is absent, may also be used to retrieve (or fetch and fill) the requested data from a source (e.g., the volume 140 of FIG. 1). To illustrate, when a client device (e.g., one of the client devices 106, 108, and 114 of FIG. 1) attempts to access data associated with the absent allocated data block 266 included in the replicated volume 160, a controller (not shown in FIG. 1) of the second storage apparatus 104 may access the buffer tree 250 to determine a suggestive indication as to the AA state of the absent allocated data block 266. The determination may be made, for example, based on the PBN index PBN-M" of the "L1" block 254 of the replicated buffer tree 250, which may suggestively indicate that the AA state for the absent allocated data block 266 is absent allocated. This may suggest to the controller that the data for the absent allocated data block 266 is not present in the replicated volume 160.

In response to a determination that the AA state for the absent allocated block 266 is absent allocated, the controller may access the replicated container map 166 to determine a determinative indication as to the AA state of the absent allocated data block 266. The determination may be made, for example, based on the PBN index PBN-M' of the entry 246 of the replicated container map 166, which may determinatively indicate that the AA state for the absent allocated data block 266 is absent. In response to authoritatively determining, based on the determinative indicator of the entry 246 of the replicated container map 166, that the AA state for the absent allocated data block 266 is absent, the controller may initiate a fetch and fill operation.

The fetch and fill operation may include requesting the data corresponding to the absent allocated data block 266 from a source (e.g., the first storage apparatus 102). The fetch request may be transmitted from the second storage apparatus 104 to the first storage apparatus 102 via the network 110. The first storage apparatus 102 may retrieve the data corresponding to the absent allocated data block 266 and may provide the data to the second storage apparatus 104 via the network 110. Upon receiving the data from the first storage apparatus 102, the second storage apparatus 104 may fill (e.g., write) the data to the replicated volume 160. The controller of the second storage apparatus 104 may then update the suggestive indicator and the determinative indicator to indicate that the data associated with the absent allocated data block 266 is now present (e.g., the AA state of the absent allocated data block 266 is present) at the replicated volume 160.

As another example, assume that the client device requests to access the absent allocated data blocks 262, 264 of the volume 160. Further, assume that the data corresponding to the absent allocated data blocks 262, 264 have been filled at the replicated volume 160 (e.g., using a background process or another technique). When the data was filled, the determinative indicator (e.g., the PBN index PBN-1' of the entry 242 of the replicated container map 166) associated with the absent allocated data blocks 262, 264 may have been updated (e.g., changed from a reserved PBN index to a valid PBN index) to indicate that the data associated with the absent allocated data blocks 262, 264 is present (e.g., a present AA state) in the replicated volume 160, but the suggestive indicator (e.g., the PBN index PBN-1' of the "L1" block 252 of the replicated buffer tree 252) may not have been updated.

The controller may access the buffer tree 250 to determine a suggestive indication as to the AA state of the absent allocated data blocks 262, 264. The determination may be made, for example, based on the PBN index PBN-1" of the "L1" block 252 of the replicated buffer tree 250, which may suggestively indicate that the AA state for the absent allocated data blocks 262, 264 is absent allocated. This may suggest to the controller that the data for the absent allocated data blocks 262, 264 are not present in the replicated volume 160.

In response to a determination that the AA state for the absent allocated blocks 262, 264 is absent allocated, the controller may access the replicated container map 166 to determine a determinative indication as to the AA state of the absent allocated data blocks 262, 264. The determination may be made, for example, based on PBN index PBN-1' of the entry 242 of the replicated container map 166, which may determinatively indicate that the AA state for the absent allocated data blocks 262, 264 is present. In response to authoritatively determining, based on the determinative indicator of the entry 242 of the replicated container map 166, that the AA state for the absent allocated data blocks 262, 264 is present, the controller may retrieve the data based on the PBN index PBN-1'.

Thus, replication of volumes according to one or more aspects of this technology may reduce an amount of time required to replicate a volume (e.g., an amount of time between receiving the volume replication request 112 and completing the cutover process). Additionally, by using the suggestive indicators and determinative indicators to indicate whether absent allocated data is present or absent from a replicated volume, an amount of time required to retrieve the absent allocated data may be reduce. Further, one or more aspects of this technology may enable access to data that is absent from a replicated volume.

Figure 3:
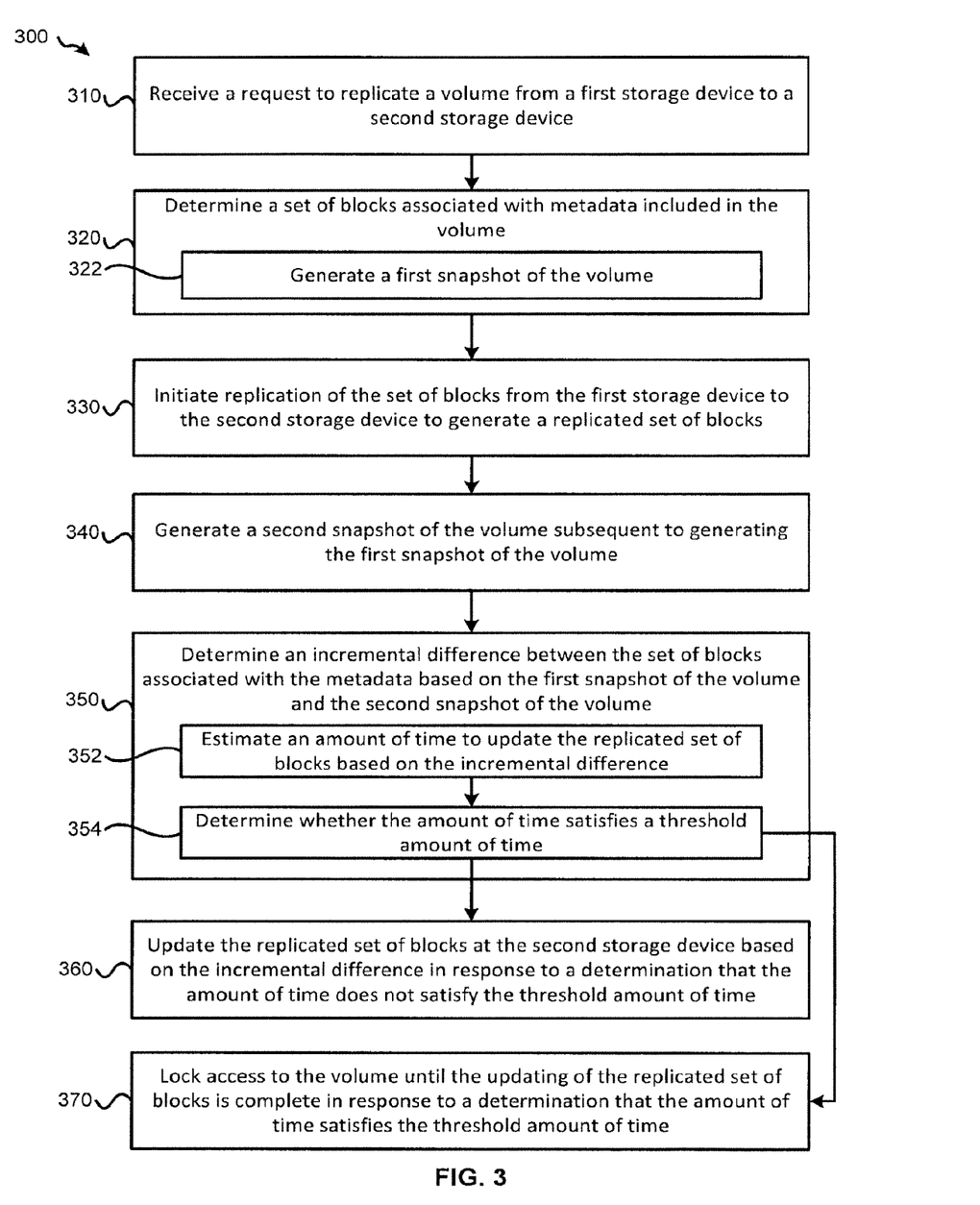
FIG. 3 is a flowchart of an example of a method for performing volume replication on demand using absent allocation.

Referring to FIGS. 1-3, an example of a method 300 for performing volume replication on demand using absent allocation according to an aspect of this technology will now be illustrated and described below.

In step 310 during operation of the environment 100, the processor 122 of the controller 120 in the first storage apparatus 102 may by way of example only receive a volume replication request 112 from the first client device 106. The volume replication request 112 may include a request to replicate (e.g., move, clone/copy, back up, etc.) the volume 140 from the first storage apparatus 102 to the second storage apparatus 104.

In step 320, in response to receiving the volume replication request 112, the processor 122 of the controller 120 may determine a first set of blocks of the source (e.g., the first storage apparatus 102) and a second set of blocks of the source (e.g., the first storage apparatus 102). In an aspect, the first set of blocks may be associated with the metadata 144, and the second set of blocks may be associated with the data 142. In another aspect, the data 142 and the metadata 144 may be stored on data blocks of one or more storage devices at the data storage device 130. Identifiers may be used to identify data blocks storing particular types of data. For example, data blocks storing the data 142 may be associated with a first identifier (e.g., an "L0" block) and data blocks storing the metadata 144 may be associated with a second identifier (e.g., an "L1" block). The identifiers may be stored in association with, or included in the metadata 144. In an aspect, a file (e.g., a kireedi file) may be included in the volume 140 and the file may include the identifiers associated with each of the data blocks included in the volume. In an aspect, the controller 120 may determine the first and second sets of blocks using the BRE engine 128. For example, the BRE engine 128 may scan a plurality of data blocks (or the kireeti file) associated with the volume 140 to identify a first set of data blocks associated with the second identifier (e.g., a set of "L1" blocks) and may determine a second set of blocks associated with the first identifier (e.g., a set of "L0" blocks). The first set of blocks may include information that may enable the controller to map VBNs and PBNs to DBNs responsive to requests to access portions of the data 142, as described above.

At step 322, the processor 122 of the controller 120 in this example may generate (or in another example instruct the BRE engine 128 to generate) a first snapshot of the volume 140. The first snapshot of the volume 140 may be a read only copy or image of the volume 140 and may establish a baseline for the volume 140. The baseline may be subsequently compared to additional snapshots to determine an incremental difference between the baseline and the subsequent snapshot, as described below. The processor 122 or the BRE engine 128 in the controller 120 may determine the first set of blocks based on the first snapshot. In an additional aspect, the replicated metadata 164 may be generated based on the first snapshot. For example, because the first snapshot is created as a read only file, the first snapshot may provide a stable image of the volume 140 that may be used to replicate the metadata 144 from the first storage apparatus 102 to the second storage apparatus 104. The processor 122 or the BRE engine 122 may replicate the metadata 142 from the first storage apparatus 102 to the second storage apparatus 104 by reading information associated with the first set of blocks from the first snapshot and transmitting the information to the second storage apparatus 104 via the network 110 to create the replicated volume 160. In an aspect, the processor 122 or the BRE engine 128 in the controller 120 may modify (or mutate) the information read from the first snapshot to indicate an absent allocated state (AA state) for each data block (e.g., the second set of blocks) corresponding to the data 142. The AA states may be provided by the suggestive indicators and the determinative indicators, as described with reference to FIG. 2. By replicating the metadata 144 using the first snapshot, access to the data 142 included in the volume 140 by the client devices 106, 108, and 114 may continue without interruption during the replication process. However, such access by the client devices 106, 108, and 114 may modify the metadata 144, such that when the replication of the metadata 144 based on the snapshot completes, the replicated metadata 164 varies from the metadata 144.

In step 330, the processor 122 of controller 120 may initiate, based on the first set of blocks, replication of the volume 140 from the first storage apparatus 102 (e.g., a source) to the second storage apparatus 104 (e.g., a destination) to generate a replicated volume 160 at the second storage apparatus 104. The replicated volume 160 may include replicated metadata 164 generated based on the first set of blocks and absent allocated data 162 associated with the second set of blocks (e.g., the data 142 included in the volume 140. The absent allocated data 162 may be absent allocated (e.g., not present) in the replicated volume 160. In an aspect, replication of the volume 140 may also include replication of the container map 146. For example, as shown in FIG. 1, the replicated volume 160 may be associated with a replicated container map 166.

According to an aspect of this technology, absent allocation of the data 162 may be provided by modifying the replicated metadata 164 and the replicated container map 164 to provide a suggestive indicators and determinative indicators associated with the absent allocated data 162. In an aspect, a particular suggestive indicator provides a suggestive indication that a particular portion of the data 142 included in the volume 140 is absent (or absent allocated) from the replicated volume 160, and a particular determinative indicator provides a determinative indication that the particular portion of the data 142 included in the volume 140 is absent from the replicated volume 160. The replicated volume 160 may provide access to the particular portion of the data 142 based at least in part on the particular suggestive indicator and the particular determinative indicator. In an aspect, the suggestive indicator may be included in the replicated metadata 164 (e.g., in the buffer tree) and the determinative indicator may be included in the replicated container map 166. Illustrative aspects of providing access to the particular portion of the data 142 based at least in part on the particular suggestive indicator and the particular determinative indicator are described with reference to FIG. 2.

In step 340, the processor 122 or the BRE engine 128 in the controller 120 may generate a second snapshot of the volume 140. The second snapshot may be generated subsequent to the first snapshot and may reflect the changes to the metadata 144 caused by the access of the data 142 by one of the client devices 106, 108, and 114 by way of example only as the metadata 144 was replicated to the second storage apparatus 104 based on the first snapshot.

In step 350, the processor 122 or the BRE engine 128 in the controller 120 may determine an incremental difference between the first set of blocks as indicated in the first snapshot and the first set of blocks as indicated in the second snapshot. The incremental difference may identify changes to the metadata 144 included in the volume 140, changes to the data 142 included in the volume 140, or both that occurred during a time period between generation of the first snapshot and generation of the second snapshot.

In step 352, the processor 122 or the BRE engine 128 in the controller 120 may estimate an amount of time to update the replicated metadata 164 based on the incremental difference. The estimated amount of time of time may correspond to an amount of time required to replicate the incremental difference to the destination (e.g., incorporate the changes to the metadata 144 since the first snapshot was generated into the replicated metadata 164).

In step 354, the processor 122 in the controller 120 may determine whether the determined amount of time is below a threshold amount of time. The threshold amount of time may correspond to an amount of time that the volume may be locked (e.g., no access to the volume by one of the client devices 106, 108, or 114) at the source without introducing an unacceptable amount of delay. In an aspect, the threshold amount of time may be between thirty (30) and forty five (45) seconds.

If in step 354, the processor 122 in the controller 120 determines the amount of time is below the threshold amount of time, then the Yes branch is taken to step 360. In step 360, the processor 122 or the BRE engine 128 in the controller 120 may update the replicated metadata 164 at the second storage apparatus 104 based on the incremental difference.

If back in step 354, the processor 122 in the controller 120 determines the amount of time is not below the threshold amount of time, then the No branch is taken to step 370. In step 370, the processor 122 in the controller 120 may lock access to the volume 140 until the updating of the replicated metadata is complete. Locking access to the volume 140 may enable synchronization of the metadata 144 (and the container map 146) with the replicated metadata 164 (and the replicated container map 166).

After updating of the replicated metadata is complete (e.g., after the metadata 144 and the replicated metadata 164 are synchronized and/or the container map 146 and the replicated container map 166 are synchronized), the processor 122 may initiate a cutover process. The cutover processor may cause access to the data 142 included in the volume 140 to be provided via the second storage apparatus 104 based on the absent allocation indicators included in the replicated metadata 164 and/or the replicated container map 166.

In an additional aspect, after initiation of the cutover process, the data 142, or a portion thereof, may be subsequently replicated from the first storage apparatus 102 to the second storage apparatus 104 using various techniques or processes. For example, the data 142 may be treated as a single virtual file that may replicated from the first storage apparatus 102 to the second storage apparatus 104 using a background process as resources of the environment 100 (e.g., resources of the first storage apparatus 102, the second storage apparatus 104, and the network 110) are available.

As another example, the processor 122 in controller 120 may initiate replication of the data 142 using single-file batch processes in which each file (e.g., user data files, applications, application data file, etc.) included in the data 142 is replicated individually (and potentially simultaneously) from the first storage apparatus 102 to the second storage apparatus 104.

As yet another example, the data 142 may be replicated from the first storage apparatus 102 to the second storage apparatus 104 using a fault-on-demand process where a portion of the data 142 (e.g., individual or select groups of files, applications, application data files, etc.) is replicated from the first storage apparatus 102 to the second storage apparatus 104 in response to a request, received at the second storage apparatus 104, to access the portion of the data 142. Irrespective of the particular technique or process used to replicate the data 142 the first storage apparatus 102 to the second storage apparatus 104, one or more of the absent allocation indicators included in the replicated metadata 164 and the replicated container map 166 may be updated to indicate that the data 142 is present (i.e., physically stored) in the replicated volume 160 at the data storage device 150.

In another aspect, the processor 122 or the BRE engine 128 in controller 120 may replicate the data 142 (or a portion thereof) based on snapshots of the volume 140 in a manner similar to replication of the metadata 144, as described above. Additionally, the processor 122 and/or the BRE engine 128 in controller 120 may determine incremental differences between the data 142 (or the portion thereof) based on successive snapshots until replication of the data 142 (or the portion thereof) is complete.

In yet another aspect, replication of the data 142 may include identifying, by the processor 122 and/or by the BRE engine 128 in controller 120, the second set of blocks (e.g., the "L0" blocks) associated with the data 142 (or the portion thereof) and replicating the second set of blocks from the first storage apparatus 102 to the second storage apparatus 104. As the second set of blocks is replicated from the first storage apparatus 102 to the second storage apparatus 104, the absent allocated data 162 may be updated or modified to indicate that the data 142 has been replicated to the replicated volume 160 and is physically present at the data storage device 150.

Replication of volumes according to one or more aspects of this technology may reduce an amount of time required to replicate the volume 140 (e.g., an amount of time between receiving the volume replication request 112 and completing the cutover process). In an aspect, the reduced amount of time may be proportional to a size of the metadata relative to a size of the volume. For example, let P represent a total storage capacity of a volume represented as a percentage (e.g., P=one hundred percent (100%)). Now let D represent a percentage of the volume associated with the data 142 and let M represent a percentage of the volume associated with the metadata 144, where P=D+M. A speed increase (T) may realized by replicating the volume 140 using one or more aspects of this technology and may be determined according to the following equation:

$$T=P/(P-D) \qquad \text{Equation 1}$$

As shown in Equation 1, when ninety five percent (95%) of the volume 140 is used to store the data 142 (e.g., D=95) and five percent (5%) of the volume 140 is used to store the metadata 144 (e.g., M=5), replication of the volume 140 according to one or more aspects of this technology may complete up to twenty (20) times faster (e.g., T=(100/(100−95))=20). Stated another way, the amount of time between receiving the volume replication request 112 and initiating the cutover process using aspects of this technology may be reduced two (2) orders of magnitude when compared to other replication techniques. Thus, one or more aspects of this technology may improve throughput and performance of a storage apparatus, such as the environment 100 of FIG. 1.

Additionally, replication of the volume 140 using one or more aspects of this technology may increase the modularity of the environment 100, the first storage apparatus 102, and the second storage apparatus 104. To illustrate, the metadata 144 (and/or the container map 146) may be used by the controller 120 (or other applications executing on the processor 122) to reason about the layout of the file system (e.g., the volume 140). By replicating the metadata 144 to the second storage apparatus 104 and absent allocating the data 142 at the second storage apparatus 104, a controller (not shown in FIG. 1) of the second storage apparatus 104 may be capable of mapping the absent allocated data to the data 142 located at the first storage apparatus 102 in a manner that is transparent to the applications, to the client devices 106, 108, and 114, to end users of the environment 100, and to other processes of the environment 100, the first storage apparatus 102, and the second storage apparatus 104.

It is noted that, although replication of the volume 140 has been described with reference to FIG. 1 as including replicating the entire volume, aspects of this technology may be used to replicate portions of the volume 140 (e.g., the replicated volume 160 may include only a portion of the data 142, a portion of the metadata 144, and/or a portion of the container map 146), to replicate multiple volumes (e.g., supporting virtual server migration), or replicate a combination of entire volumes and portions of volumes (e.g., to consolidate a first volume with a portion of a second volume). Additionally, although aspects of this technology are described as transferring all of the metadata, volumes may be replicated according to one or more aspects of this technology by replicating only a portion (or subset) of the metadata 144 (e.g., only replicating portions of the metadata 144 required for mapping block numbers, such as VBNs and PBNs, to DBs). Additionally, aspects of this technology may be used to clone the volume 140 at the second storage apparatus 104, to back up the volume 140 at the second storage apparatus 104, and to implement other data management techniques depending on a particular system design, configuration, implementation, and performance considerations.

In yet another aspect, disk blocks of the data storage device 130 allocated to the volume 140 may be released (e.g., made available for allocation to other containers or volumes) upon completing replication of the volume 140 (e.g., completing replication of the data 142, the metadata 144, and the container map 146) from the first storage apparatus 102 to the second storage apparatus 104. Thus, when replication of the volume 140 corresponds to a volume move operation (e.g., moving the volume from the first storage apparatus 102 to the second storage apparatus 104), the resources (e.g., the disk blocks) allocated to the volume 140 at the first storage apparatus 102 may be reclaimed.

Additionally, although the first storage apparatus 102 and the second storage apparatus 104 are illustrated as being remotely connected via the network 110, the first storage apparatus 102 and the second storage apparatus 104 may be located at a single location (e.g., a single building or a data center).

Further, although the environment 100 of FIG. 1 is illustrated as including two storage apparatuses 102 and 104, aspects of this technology may be utilized in apparatuses or other systems having more than two or fewer than two storage systems. Further, although aspects of FIG. 1 have been described in terms of replicating the volume 140 from the first storage apparatus 102 to the second storage apparatus 104, aspects of this technology may also be used for restoring volumes (e.g., from a backup copy of the volume) or replicating volumes within a single storage system. An amount of time to restore a volume from a backup may be reduced according to one or more aspects of the embodiments disclosed herein.

Accordingly, as described and illustrated by the examples herein, replication of volumes according to one or more aspects of the this technology may reduce an amount of time required to replicate a volume (e.g., an amount of time between receiving the volume replication request 112 and completing the cutover process). Additionally, by using the suggestive indicators and determinative indicators to indicate whether absent allocated data is present or absent from a replicated volume, an amount of time required to retrieve the absent allocated data may be reduce. Further, one or more aspects of this technology may enable access to data that is absent from a replicated volume.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:

receiving, with a storage computing apparatus, a request to replicate a volume, wherein the volume includes data and metadata, and wherein the metadata includes information descriptive of the data;

determining, with the storage computing apparatus, a first set of blocks and a second set of blocks, wherein the first set of blocks is associated with the metadata, and the second set of blocks is associated with the data included in the volume;

initiating, with the storage computing apparatus, replication of the volume to generate a replicated volume, wherein the replicated volume includes replicated metadata generated based on the first set of blocks;

generating, with the storage computing apparatus, a first snapshot of the volume;

generating, with the storage computing apparatus, a second snapshot of the volume subsequent to generating the first snapshot;

determining, with the storage computing apparatus, an incremental difference between the first set of blocks as indicated in the first snapshot and the first set of blocks as indicated in the second snapshot;

initiating, with the storage computing apparatus, an update to the replicated metadata based on the incremental difference;

estimating, with the storage computing apparatus, an amount of time to update the replicated metadata based on the incremental difference;

determining, with the storage computing apparatus, whether the amount of time satisfies a threshold amount of time; and locking, with the storage computing apparatus, access to the volume until the replicated metadata is updated in response to a determination that the amount of time satisfies the threshold amount of time.

2. The method for claim 1, further comprising:
generating, with the storage computing apparatus, an additional snapshot of the volume in response to a determination that the amount of time does not satisfy the threshold amount of time;
wherein the additional snapshot of the volume is generated subsequent to initiating the update to the replicated metadata based on the incremental difference; and
wherein the additional snapshot of the volume is used to determine a second incremental difference between the first set of blocks as indicated in the second snapshot and the first set of blocks as indicated in the additional snapshot.

3. The method for claim 1, wherein the incremental difference identifies changes to the metadata included in the volume, changes to the data included in the volume, or both that occurred during a time period between generating the first snapshot and the second snapshot.

4. The method for claim 1, further comprising:
initiating, with the storage computing apparatus, replication of a portion of the second set of blocks in response to completing replication of the first set of blocks.

5. The method for claim 4, wherein the portion of the second set of blocks is replicated using a background process.

6. The method for claim 4, wherein the portion of the second set of blocks is replicated.

7. A non-transitory computer readable medium having stored thereon instructions for replicating a volume comprising machine executable code which when executed by a processor, causes the processor to perform steps comprising:
receiving a request to replicate a volume, wherein the volume includes data and metadata, and wherein the metadata includes information descriptive of the data;
determining a first set of blocks and a second set of blocks, wherein the first set of blocks is associated with the metadata, and the second set of blocks is associated with the data included in the volume;
initiating replication of the volume to generate a replicated volume, wherein the replicated volume includes replicated metadata generated based on the first set of blocks;
generating a first snapshot of the volume;
generating a second snapshot of the volume subsequent to generating the first snapshot;
determining an incremental difference between the first set of blocks as indicated in the first snapshot and the first set of blocks as indicated in the second snapshot;
initiating an update the replicated metadata based on the incremental difference;
estimating an amount of time to update the replicated metadata based on the incremental difference;
determining whether the amount of time satisfies a threshold amount of time; and
locking access to the volume until the replicated metadata is updated in response to a determination that the amount of time satisfies the threshold amount of time.

8. The medium for claim 7, further comprising:
generating an additional snapshot of the volume in response to a determination that the amount of time does not satisfy the threshold amount of time;
wherein the additional snapshot of the volume is generated subsequent to initiating the update to the replicated metadata based on the incremental difference; and
wherein the additional snapshot of the volume is used to determine a second incremental difference between the first set of blocks as indicated in the second snapshot and the first set of blocks as indicated in the additional snapshot.

9. The medium for claim 7, wherein the incremental difference identifies changes to the metadata included in the volume, changes to the data included in the volume, or both that occurred during a time period between generating the first snapshot and the second snapshot.

10. The medium for claim 7, further comprising:
initiating replication of a portion of the second set of blocks in response to completing replication of the first set of blocks.

11. The medium for claim 10, wherein the portion of the second set of blocks is replicated using a background process.

12. The medium for claim 10, wherein the portion of the second set of blocks is replicated.

13. A network appliance apparatus comprising:
at least one processor; and
at least one memory coupled to the processor configured to execute programmed instructions stored in the memory comprising:
receiving a request to replicate a volume, wherein the volume includes data and metadata, and wherein the metadata includes information descriptive of the data;
determining a first set of blocks and a second set of blocks, wherein the first set of blocks is associated with the metadata, and the second set of blocks is associated with the data included in the volume;
initiating based on the first set of blocks replication of the volume to generate a replicated volume, wherein the replicated volume includes replicated metadata generated based on the first set of blocks;
generating a first snapshot of the volume;
generating a second snapshot of the volume subsequent to generating the first snapshot;
determining an incremental difference between the first set of blocks as indicated in the first snapshot and the first set of blocks as indicated in the second snapshot;
initiating an update to the replicated metadata based on the incremental difference;
estimating an amount of time to update the replicated metadata based on the incremental difference;
determining whether the amount of time satisfies a threshold amount of time; and
locking access to the volume until the replicated metadata is updated in response to a determination that the amount of time satisfies the threshold amount of time.

14. The apparatus for claim 13, wherein the processor is further configured to execute programmed instructions stored in the memory further comprising:
generating an additional snapshot of the volume in response to a determination that the amount of time does not satisfy the threshold amount of time;
wherein the additional snapshot of the volume is generated subsequent to initiating the update to the replicated metadata based on the incremental difference; and
wherein the additional snapshot of the volume is used to determine a second incremental difference between the first set of blocks as indicated in the second snapshot and the first set of blocks as indicated in the additional snapshot.

15. The apparatus for claim 13, wherein the incremental difference identifies changes to the metadata included in the volume, changes to the data included in the volume, or both that occurred during a time period between generating the first snapshot and the second snapshot.

16. The apparatus for claim 13, wherein the processor is further configured to execute programmed instructions stored in the memory further comprising:
    initiating replication of a portion of the second set of blocks in response to completing replication of the first set of blocks.

17. The apparatus for claim 16, wherein the portion of the second set of blocks is replicated using a background process.

18. The apparatus for claim 16, wherein the portion of the second set of blocks is replicated.

* * * * *